June 6, 1933. R. A. WATSON 1,912,606
APPARATUS FOR BABBITT LINING BEARING SHELLS
Filed Dec. 1, 1930 3 Sheets-Sheet 1

INVENTOR
Russell A. Watson
BY
Swan and Frye
ATTORNEYS

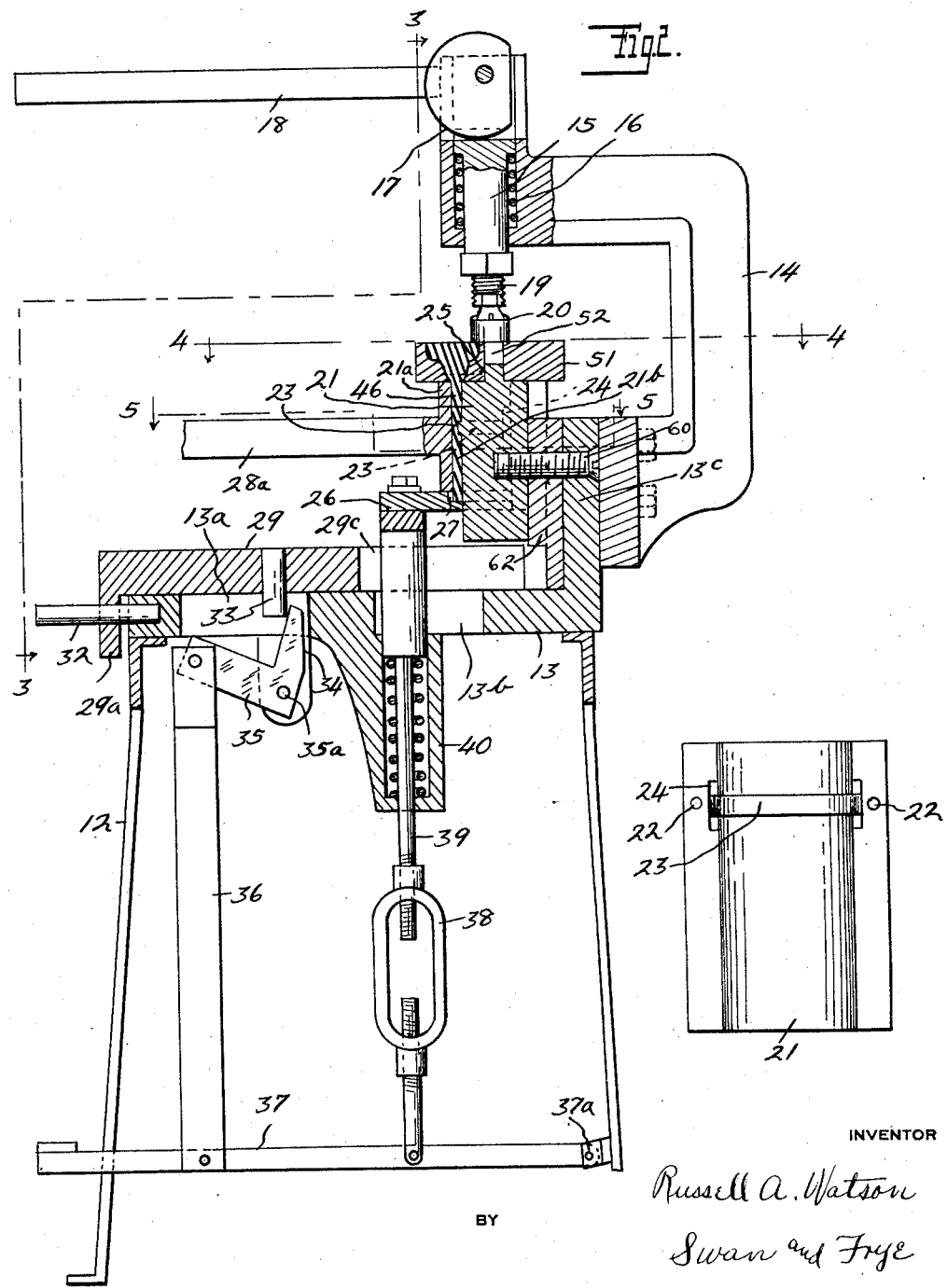

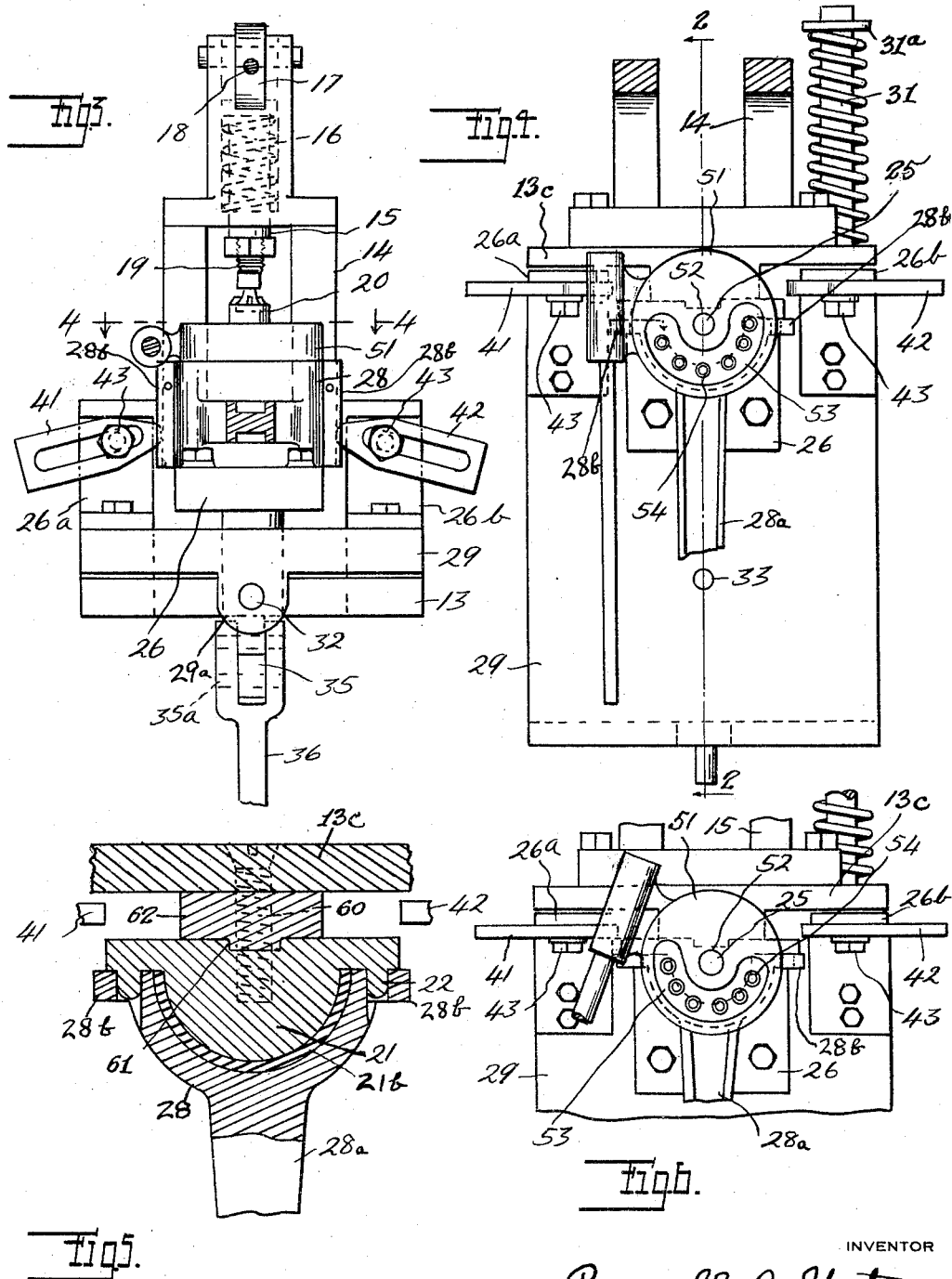

Patented June 6, 1933

1,912,606

UNITED STATES PATENT OFFICE

RUSSELL A. WATSON, OF DETROIT, MICHIGAN, ASSIGNOR TO FEDERAL MOGUL CORPORATION, OF DETROIT, MICHIGAN, A CORPORATION OF MICHIGAN

APPARATUS FOR BABBITT-LINING BEARING SHELLS

Application filed December 1, 1930. Serial No. 499,149.

This invention relates to mechanism particularly adapted for holding half-bearing shells in place while their concaved surfaces are being faced with an applied coat of initially molten babbitt or other bearing material, and has for its object an improved organization of parts adapted for facilitating this described operation, particularly in connection with either of the separable and complementary halves of the large bearing of a connecting rod, whose construction, as is well-known, involves the union of the two parts into relative positions of complete circularity by means of bolts or similar holding elements passing through laterally extending flanges of each. With but slight dimensional modification of certain of the cooperating parts my improvement is also equally adaptable to work upon truly semi-circular, that is to say, non-flanged bearing shells. Before this babbitting is accomplished however, or if the articles under this treatment are already-used connecting rods which have been turned in for rebabbitting, the two halves of the bearing as assembled are separated one from another, and it is the particular purpose of this mechanism to facilitate the firm and accurate holding of either of these parts relatively to a complementarily curved surface which forms a permanent part of the mechanism here to be described, in the intentionally intervening space between which fluid babbitt is poured and allowed to harden. Even though under ideal conditions some slight grinding and finishing of the applied babbitt coat on the concaved surface of the bearing as completed, may be necessary, it is highly important that each one of the successively worked upon half-bearing elements be accurately and firmly held in relation to the fixed parts of the mechanism, so that any variances in the thickness of the bearing metal coat made adherent thereto may be kept within negligible proportions.

My preferred means for accomplishing this desired purpose in such rapid succession as not to unduly interfere with high speed production conditions is disclosed in the accompanying drawings, wherein:

Figure 2 is a largely sectional side elevational view, designed to bring out particularly the interaction of the various movable parts of the device.

Figure 3 is an elevational view of the upper front portion of the mechanism, taken along the line 3—3 of Figure 2 and looking in the direction of the arrows there shown.

Figure 4 is a plan view of the important parts of the mechanism, taken along the line 4—4 of Figure 3 and looking in the direction of the arrows there shown.

Figure 5 is an enlarged sectional detail view taken along the line 5—5 of Figure 2 and looking in the direction of the arrows there shown.

Figure 6 is a plan view similar to Figure 4, but showing the preferred form of pouring cap in the sprue cutting position.

Figure 7 is a large scale detail view of one form of ridge contouring for the face of the forming core which results, after the babbitt is poured and hardened, in there being a corresponding groove or depression in the bearing face thereof.

Figure 1:
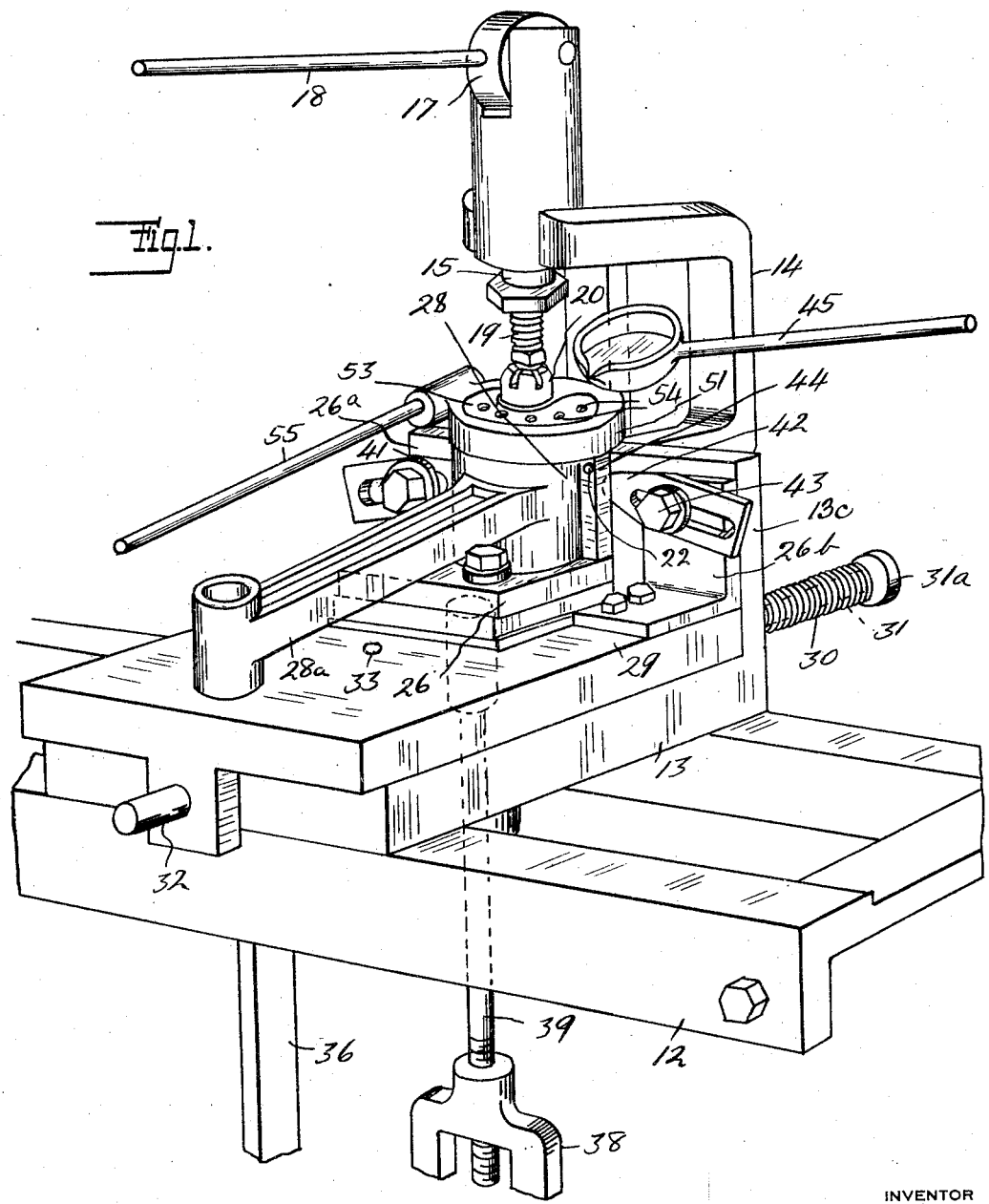
Figure 1 is a perspective of my improved constructon.

For convenience of access the apparatus here in question is preferably mounted at a suitable height upon a table or frame 12, the fixed horizontal portion 13 of which is provided with a pair of apertures 13a and 13b to which further detailed reference will be made. A riser portion 14, positioned at the rear of the table as regards the location of the operator, constitutes an over-engaging bracket or support, within which is slidably mounted a downwardly actuatable compression or holding bit 15, which is yieldingly held in raised position by the draw of the spring 16, but which may be actuated downwardly by movement of the cam 17 under actuation of the hand lever 18. In the lower end of this compression member is positioned an adjusting screw 19, by means of which the desired degree of initial lowering or positioning of the knuckled work-engaging terminal 20 may be determined.

Also supportingly positioned upon the framework, immovably as regards any particular job then in progress, though substitutably when bearings of different contour or diameter are to be worked upon, is a forming core 21, whose exposed peripheral surface is of the curvature of the bearings which are to be worked upon, but which is provided on either side of the curved surface with projecting studs, as 22, which are designed to fit into the screw bores of the half-bearings as they are positioned against the curved surface, and thus locate the individual shells accordingly with respect to the curved surface of the forming core 21. The position of these adjusting studs should correspond with the position in the bearing shell of the bolt holes in the complementary shell parts of a connecting rod bearing, so that the spaces thus protectively filled by the studs 22 while the babbitting operation is in progress will, when the bearing shells are completed and ready for assembly, remain for the passage of the correlating bolts therethrough. In Figure 7 the curved surface 21 is also shown as provided with a bounding ridge or projecting bead 23, from which branch off upward and downward projections 24 at either end thereof, in order to allow for a correspondingly positioned groove in the concave surface of the bearing shell and for the oil outlets therefrom. It will of course be understood that this merely represents one form of machining upon a bearing shell that is to be worked upon, and any desired contouring of the upstanding ridge or ridges which matches the machining upon any series of bearing shells to be worked upon may be substituted as to the curved face of this contoured block 21 without departure from the intended scope of the present disclosure. This contoured block may be anchored in position relatively to the frame as a whole by means of a screw 60 and dado joint 61 formed upon the die block 21 and anchor block 62; the two blocks and the upstanding portion 13ᶜ of the base 13 being secured together by the screw, in the manner shown in Figure 5.

Also fixedly though substitutably supported by the frame structure is a base plate or bottom flange former 26 which, if the shape of the bearing shell 21a to be worked upon calls therefor, may be provided with a semi-circular trough or groove 27, which, spacedly surrounding the bottom end of the curved forming core 21 will permit the molten babbitt, when poured into the space 21b as hereinafter described, to flow thereinto and form a correspondingly desired contour of the finished babbitt lining of the shell accordingly. In Figure 1 I have illustrated at 28a the arm or rod portion of a connecting rod, separated of course from its complementary, and when assembled bolt-held, cap member, in position relatively to the parts thus far described, one end or flat edge of the bearing head resting on the top surface of this bed plate, while its other edge, spaced from the descending holding knuckle 20 by the pouring gate 51, which will be hereafter described, is pressed downwardly into immobile relation with the holding plate and with the contoured core 21 for the babbitting process in question. The only difference from the showing in Figure 1 when the cap portion of a connecting rod bearing is being babbitted is that there is no forwardly projecting arm portion extending over the front portion of the table. As brought out in Figures 2, 4, and 6 particularly, it will be noted that with this assembly of parts the upstanding stud 25 at the top of the forming core 21 fits into a corresponding bore, as 52, in the body of the pouring gate 51, thus centering the forming core accurately with respect to each shell which is in turn worked upon.

Slidably supported upon the top of the table surface 13 is a shelf member 29, which is yieldingly held in backwardly drawn position by the spring 30, one end of which engages against the adjacent portion of the frame, while its other end engages against the headed end 31a of the bolt or stem 31, whose inner end is threadedly integrated with the rearward edge of the slidable shelf 29. The degree of projection or retraction of this latter may also be regulated by the pin 32 which passes through the downwardly depending lip 29a of the shelf 29 and engages against the adjacent edge of the table top 13. The shelf 29 also has depending from its under surface a pin 33 which is adapted to be engaged by the upward projecting nose 34 of the lever 35, which is pivoted at 35a to a suitably located fixed projection from the under surface of the table 13; this lever 35 is connected by the link 36 at the opposite end from its nose 34 with the foot-actuatable treadle 37, which spacedly passes through one of the already-mentioned apertures, as 13a, in the table top 13 and in the shelf 29, and the rear end of which is pivoted at 37a to the rearward portion of the frame 12. By actuation of this treadle and its described connected parts, the shelf 29 may be drawn forward at the end of each bearing-lining operation and against the pull of the spring 30, to effect the detachment of the bearing shell 50 and its then hardened-on babbitt lining 21b from the forming core 21 already described.

Also connected with the treadle, and made adjustable as to exact degree of throw through the medium of the turnbuckle 38, is a stem 39, which after passing spacedly through the aperture 13b in the table 13 and shelf 29 and through a bearing box 40, which is an integral part of the base 13, is operatively connected at its top end with the bottom flange former 26 already mentioned. Downward pressure of the operator's foot upon the treadle 37 thus results in both drawing the shelf 29 outwardly, because of the engagement of the parts 34 and 35 already mentioned, and at the same time drawing down the link 39 and the bottom flange former 26 at the end of the babbitt-pouring operation. When the babbitt has hardened adequately, the described outward movement of the shelf 29 and its connected parts including the upstanding bracket 26a and 26b on either side of the plate 26 results in the outward drawing away from the fixed portion of the supporting frame and against the marginal edges of the bearing being worked upon, of the adjustable stripping pieces 41 and 42 which are held in desired adjusted relation on their respective brackets 26a and 26b by means of the nuts 43, thus effecting the forcible separation of the now hardened babbitt from what adhesion may have taken place between it and the adjacent flanking plane faces of the forming core 21, and leaves the bearing shell, whether it be the rod piece or the cap piece, free for detachment in favor of the next unit to be worked upon. The slight marginal overlapping of the ends of the adjustable stripping pieces 41 and 42 by the flanges 28b of the bearing shell is brought out particularly in Figures 4, 5, and 6, as well as by dotted lines in Figures 1 and 3.

In practice I have found it desirable to first effect the breaking of the adhesion between the babbitt and the correspondingly formed surface 27 of the base plate 26, by effecting the actuated downward travel of the latter, slightly before the drawing away of the now fully babbitted half-bearing from the core 21 is attempted. This avoids any possibility of the now formed babbitt flange being broken off, which might be the case if both the base plate 26 and the table 29 were started in their retractile movement at the same time. This is preferably effected by positioning the tips of the stripping pieces 41 and 42 in slightly spaced relation behind the face of the core 21 so that they must move through an appreciable space horizontally before they encounter the bolt bosses of the bearing shell then under treatment, or if the bearing shells be plain, that is, not flanged, against their adjacent straight edges. During this interval before the displacement of the now babbitted bearing shell relatively to the core 21 begins, the already described downward movement of the plate 26 has started, thus freeing the babbitted flange accordingly. This slight delaying of the stripping movement of the parts 41 and 42 might be effected in other ways, as, for example, making a lost-motioned slotted connection for the link 36 which operatively connects the treadle 37 and the slidable shelf 29.

In thus applying a babbitt facing to the concaved surface of a bearing shell it has been my experience that if the necessary quantity of molten babbitt be poured into the relatively thin curved space which the positioning of the shell has left between its concaved surface and the outwardly rounded or convexed surface of the forming core 21, there is a tendency on the part of the babbitt as poured to harden so rapidly as to form blow holes, which, when the supposedly finished bearing comes up for machining and final inspection, results in its being rejected for this reason. To obviate this, while partaking of the benefits afforded by the firm holding of the bearing shell, in the manner already described, I interpose between the top edge of the bearing shell as positioned and the top of the forming core 21 a pouring mold or gate 51, provided at its center, as already mentioned, with a registry hole 52 into which the upstanding stud 25 on the top of the core 21 engages for accurate registry. The knuckled lower end 20 of the depending clamp mechanism already mentioned engages the top surface of this block 51. The top surface of this latter is recessed or troughed through an adequate arcuate length, as indicated at 53, and the bottom of this trough portion is provided with a plurality of rounded pouring holes, as 54, through which the molten babbitt supplied through the ladle 45 passes down into the space 46 between the complementary surfaces of the core 21 and of the bearing shell 50 in a plurality of small streams which go to fill up correspondingly diversely positioned portions of the space, thus obviating reliance upon the latter happening to be adequately filled before the babbitt becomes too hard to flow further from a single pouring stream source. When the space which represents the plane of the applied babbitt lining when the article is completed has thus been filled, so that no more fluid babbitt can proceed through the holes 54 a quick and relatively slight turn upon the handle 55 is all that is necessary to break off this "gate" portion of the now practically hardened babbitt mass, and leave the top of the babbitted bearing shell cleanly cut off. As soon as the clamping seizure of the described parts has been terminated by upward manual actuation of the cam lever 18, this removable gate plate may be lifted off from the top of the bearing shell and the core 21, and when reversed in position, so that the troughed portion 53 faces downwardly, this latter may be freed of whatever rapidly hardening but still detachable babbitt metal remains therein and in the holes 54 by sharply tapping it against a corner of the table or a conveniently located scrap container. If, however, it be desired to dispense with this pouring gate, it is merely necessary to bring the properly contoured descending clamp terminal 20 into direct engagement with the exposed top edge of the bearing shell before the pouring operation is begun, the action of the bottom flange-forming plate 26 and its supported and cooperating parts upon the bearing shell when babbitt faced as already described being the same.

What I claim is:

1. Apparatus for facilitating the die casting of an adherent coat of babbitt upon the presented surface of a half-bearing shell, comprising, in combination, a frame provided with a forming face of complementary contour to that of the shell which is to be babbitted, a resiliently supported rest upon which the shells are successively positioned in appropriate propinquity to said forming face of the frame, a manually operable clamp supported by an overengaging portion of the frame in position to seizingly engage the lateral edges of the bearing shell cooperatively with the resiliently supported rest member, a horizontally slidable shelf supported by said frame member and provided with projecting portions adapted to effect the displacement of the shell and its then adherent coat of babbitt at the end of each pouring operation, and means operatively connected with both said shelf and the resiliently supported rest member and adapted to be actuated at the will of the operator whereby the described shell-displacing movement of said shelf and a downward movement of the resilient rest may be effected.

2. A die casting mechanism for half bearing surfaces comprising, in combination with a base, a pedally actuatable shelf supported on said base in position of limited movement in a substantially horizontal plane, a formed abutment carried by said base and against which a bearing whose babbitting is desired is adapted to be positioned, a selectively contoured plate carried by said table, a spring for yieldingly lifting said formed plate against the under side of the bearing shell as the latter is positioned against said formed abutment, an adjustable clamp supported by an overengaging portion of the base and adapted to cooperate with said selectively contoured plate in holding the successively positioned bearings in desired position relatively to said plate, and common means for moving the shelf and plate to disengage a cast bearing.

3. In combination with a base member provided with an overengaging top portion, a vertically adjustable clamp member supported thereby, a horizontally movable shelf member supported by said base subjacently of said clamp member, adjustable work-disengaging members carried by said shelf member in position of potential disengagement of the bearing members successively positioned between said shelf and said clamp member, a vertically movable closure member, means for yieldingly forcing the closure member upwardly against the lower edge of the bearing shell then being worked upon, means for selectively actuating said shelf member in a horizontal plane and a closure member in a vertical plane upon the completion of the designed work upon it, and a formed abutment against which the concave surface of the bearing shell is forced for cooperative confinement by their then adjacent surfaces of a poured-in quantity of bearing metal.

4. Means adapted to cooperate with the concave bearing face of a bearing shell upon which the die-casting of a coating of babbitt metal is desired, comprising a frame member carrying a forming die of complementary convex contour to the concavity of the bearing surface to be babbitted, spacedly adjacent which the bearing shells are adapted to be successively positioned for the die-casting operation, manually operable clamping means for holding the shells as thus positioned against displacement, a closure member engageable with the bottoms of the die and shell, and common actuating means controllable at the will of the operator for drawing the babbitted shell away from said forming die and the closure member away from both upon the completion of each die casting operation.

In testimony whereof I sign this specification.

RUSSELL A. WATSON.